Oct. 26, 1965  F. HURTH ETAL  3,213,754
METHOD AND APPARATUS FOR TREATING
GEARS AND SIMILAR WORKPIECES
Filed Nov. 19, 1963  3 Sheets-Sheet 1
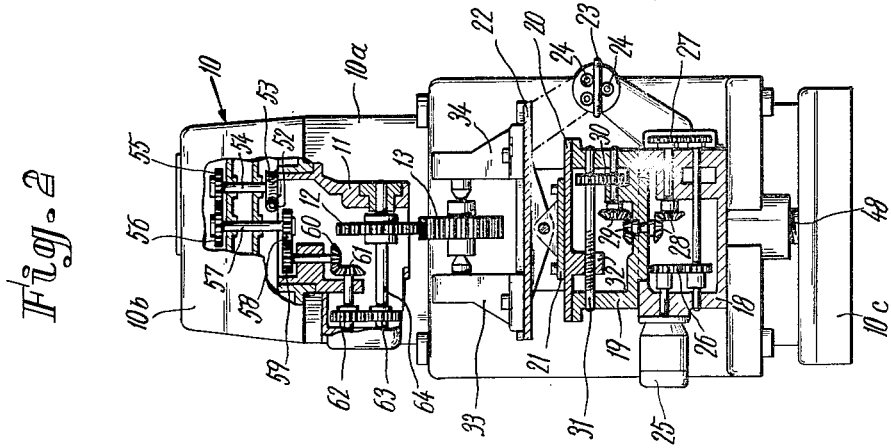
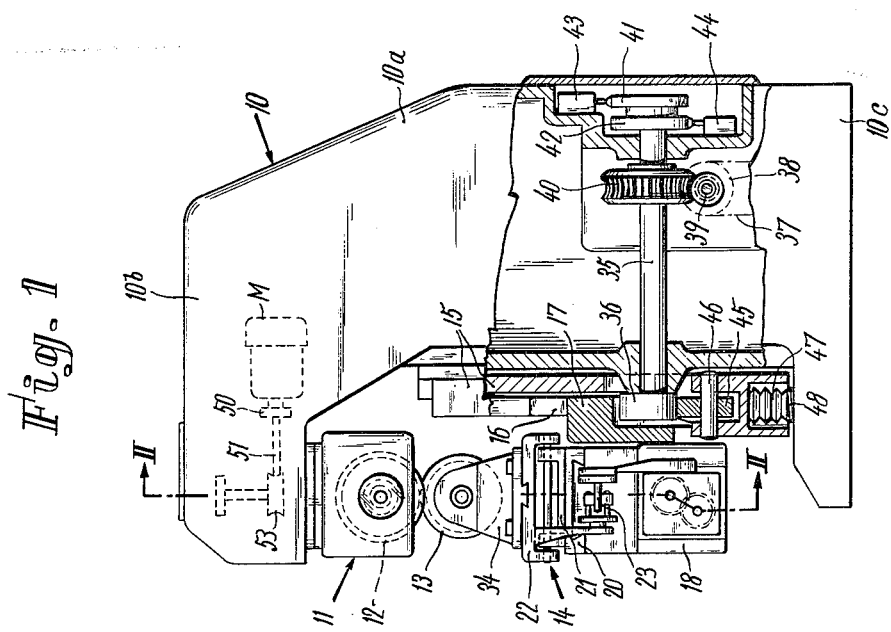
INVENTORS
FRITZ HURTH
MANFRED ERHARDT
BY
Michael J. Striker
their ATTORNEY

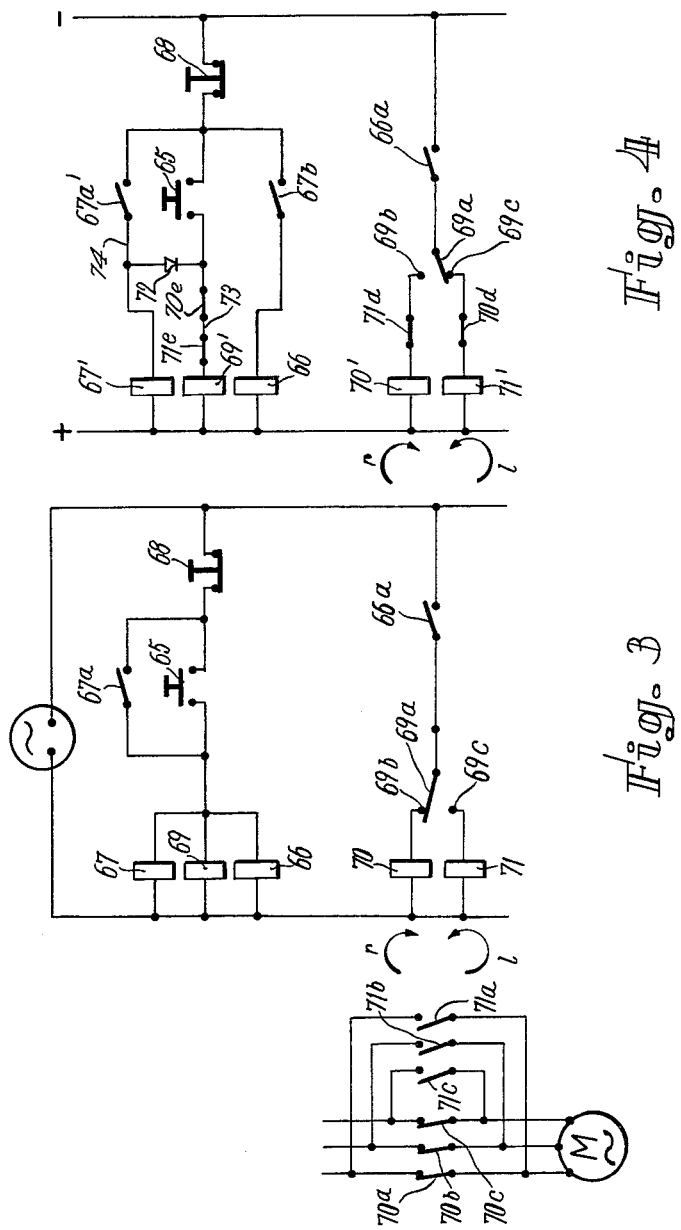

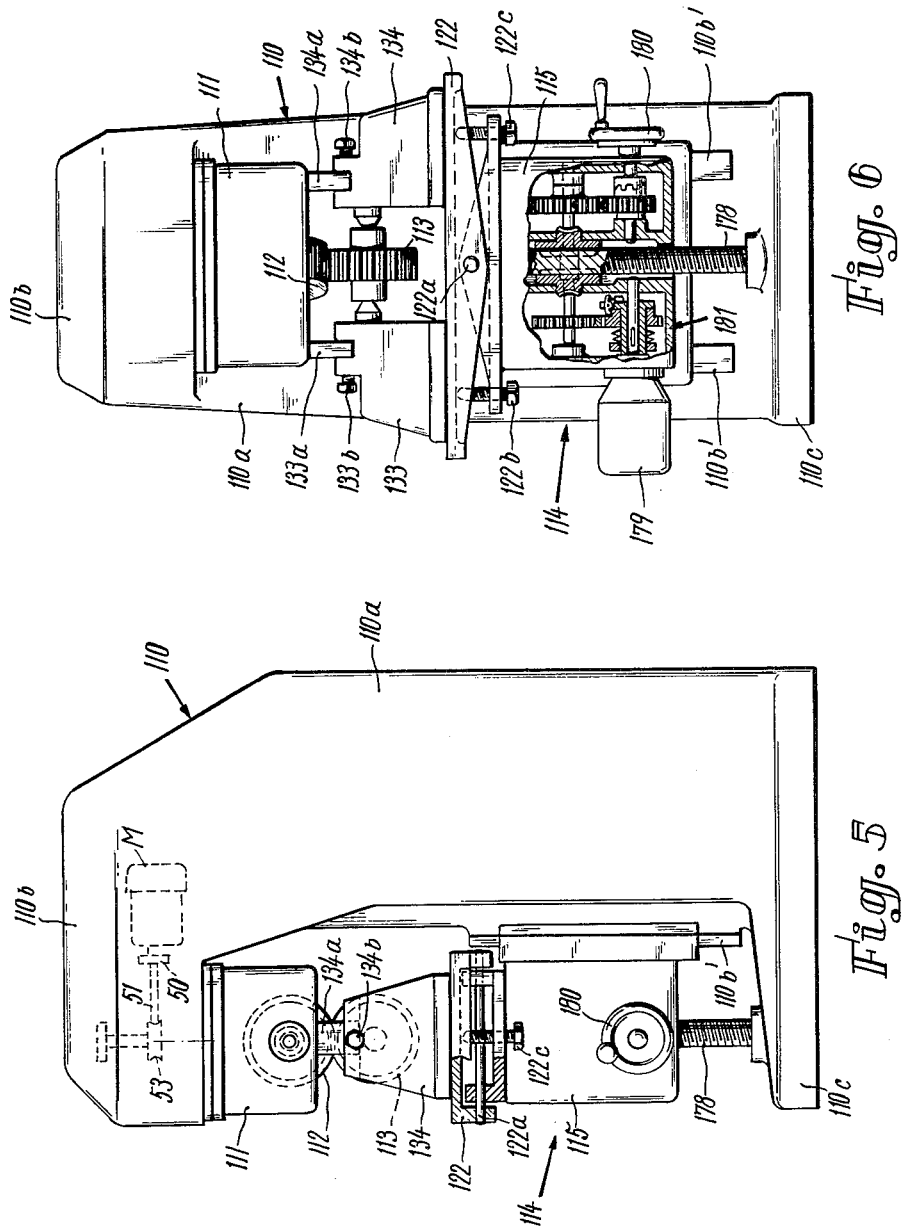

United States Patent Office 3,213,754
Patented Oct. 26, 1965

1

3,213,754
METHOD AND APPARATUS FOR TREATING GEARS AND SIMILAR WORKPIECES
Fritz Hurth, Grunwald, near Munich, and Manfred Erhardt, Munich, Germany, assignors to Carl Hurth Maschinen- und Zahnradfabrik, Munich, Germany
Filed Nov. 19, 1963, Ser. No. 324,655
Claims priority, application Germany, Nov. 21, 1962, H 47,469
15 Claims. (Cl. 90—1.6)

The present invention relates to gear cutting, grinding, shaving, lapping and burnishing machines in general, and more particularly to an improved process and apparatus for finishing gears and similar workpieces in accordance with the so-called crossed axes method.

In many presently known apparatus for treatment of gears and similar workpieces, the direction of rotation of the gear-shaped tool is reversed at least once while the teeth of the tool are in actual mesh with the teeth of a workpiece. Such operation is intended to insure that all tooth flanks of the tool will wear away to the same extent. For example, and when a revolving gear is treated by a gear-shaped shaving tool while the gear and/or the tool simultaneously moves back and forth in the axial direction thereof, it is customary to reverse the direction of rotation whenever the reciprocating gear reaches the one or the other end of its axial stroke. This means that the tool must be arrested and thereupon begins to rotate in the opposite direction at frequent intervals with resultant wear on the moving parts of the apparatus. The situation is quite similar when the shaving operation is carried out in accordance with the so-called plunge method. The tool must be arrested while its teeth actually mesh with the teeth of a workpiece, and the direction of rotation is thereupon reversed in order to insure that the other flank of each tooth will be subjected to wear while the tool removes shavings from the tooth flanks of a workpiece. Such operation is likely to produce chatter marks on the teeth of the workpieces, and such operation also necessitates more time than if the tool were permitted to rotate in the same direction from the start and all the way to completion of a shaving operation. The braking action which must precede each reversal in the direction of rotation requires at least some time so that the overall time needed for a treating or finishing operation is extended with resultant losses in output.

If the tool continues to rotate in the same direction, he wear on its teeth is not uniform which, in turn, results in inferior finish of the workpieces. Proposals are known to avoid such drawbacks by using tools with specially configurated tooth flanks; however, such tools are quite expensive, they are difficult to regrind, and care must be taken to avoid improper mounting of such tools in a gear cutting, grinding, shaving, lapping or burnishing machine.

Accordingly, it is an important object of our invention to provide a process and apparatus which avoid all or at least some drawbacks of conventional processes and apparatus, and to provide an improved apparatus for finishing gears or similar workpieces by means of a gear-shaped tool and in accordance with the crossed axes method.

Another object of the invention is to construct the apparatus in such a way that each of a series of consecutively treated workpieces is treated to the same degree of precision finish.

A further object of the invention is to provide a process for grinding, cutting, shaving, lapping or burnishing of gears and similar toothed workpieces by means of a gear-shaped tool according to which the wear on all portions of the tool is uniform even though the tool need not be reversed while its teeth mesh with the teeth of a workpiece.

2

An additional object of our invention is to provide a process of the just outlined characteristics according to which the wear on the tool is uniform regardless of the exact nature of the finishing operation, i.e., whether the workpieces are treated in accordance with the so-called plunge-, underpass- or transverse-shaving, grinding, lapping or burnishing method.

Still another object of the instant invention is to provide an apparatus which may be used for practice of our process and which insures that each flank of the gear-shaped tool wears away to the same extent with resultant superior finish of the workpieces.

A concomitant object of the invention is to provide an apparatus of the above outlined characteristics wherein the treatment of a series of consecutive workpieces may be completed with substantial savings in time without affecting the quality of the finish and with substantial reduction in noise and wear on moving parts of the apparatus.

A further object of the invention is to provide an apparatus of the above outlined characteristics which is constructed and assembled in such a way that the tool will automatically wear away at a uniform rate in all such zones thereof which come into actual contact with the workpieces, and whose operation is fully automatic so that it requires no attention once it is started to perform a shaving, grinding, cutting, lapping or burnishing operation on a series of consecutive gears or similar toothed workpieces.

Another object of the invention is to provide a novel electric circuit arrangement which may be utilized to control the operation of the motor serving to rotate the tool and/or the workpiece in the course of a finishing operation.

An additional object of our invention is to provide an electric circuit arrangement which will automatically reverse the direction of rotation of the tool or of the workpiece so that the operator in charge of the apparatus in which the circuit arrangement is used need not devote any time for controlling the direction in which the tool rotates.

With the above objects in view, one feature of our invention resides in the provision of a process for treating gears and similar toothed workpieces by means of a revolving gear-shaped tool, e.g., by means of a shaving tool provided with serrated teeth. The process comprises bringing the tool into mesh with a series of consecutive workpieces so that the teeth of the tool treat the teeth of the workpieces, rotating the tool alternatively in a clockwise and counterclockwise direction to insure that all tooth flanks of the tool wear away in response to engagement with the tooth flanks of consecutively treated workpieces, and reversing the tool at such frequency that the length of intervals between successive reversals in the direction of rotation of the tool is sufficient to complete the treatment of at least one workpiece whereby the tool need not be reversed while its teeth actually mesh with the teeth of a workpiece. In other words, the direction in which the tool rotates is reversed only during intervals between treatments of two consecutive workpieces but never while the tool actually treats a workpiece.

In accordance with a preferred embodiment of our process, the tool is reversed subsequent to treatment of each consecutive workpiece, and its axis crosses in space the axis of the workpiece which is in mesh therewith.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which, FIG. 1 is a side elevational view of a gear finishing machine which embodies one form of our invention, a portion of the frame and of the work holder being broken away;

FIG. 2 is a vertical section as seen in the direction of arrows from the line II—II of FIG. 1;

FIG. 3 is a schematic diagram of the electric circuit arrangement for the reversible motor which drives the gear-shaped tool of the machine shown in FIGS. 1 and 2;

FIG. 4 is a schematic diagram of a slightly different electric circuit arrangement;

FIG. 5 is a side elevational view of a modified gear finishing machine; and

FIG. 6 is a front elevational view of the modified machine with a portion of the work holder broken away.

Referring to FIGS. 1 and 2, there is shown a crown shaving machine whose frame 10 comprises a hollow column 10a, a hollow head 10b and a base 10c. The head 10b suports a tool holder 11 for a gear-shaped shaving tool 12 having serrated teeth. A gear-shaped workpiece 13 is reciprocable by a composite work holder 14 so as to perform strokes in directions parallel with the axis of the tool 12, and the work holder 14 is also reciprocable vertically toward and away from the tool holder 11. The work holder 14 comprises a slide 15 which is reciprocable in vertical ways (not shown) provided on the front face of the column 10a, and the front face of the slide 15 is provided with a vertical groove for a rail 16 of a second slide 17 which carries a fixed housing 18 for the vertical shaft of a rotary carriage 19. The carriage 19 supports a reciprocable slide 20 which carries a pivotable base plate 21 for a tiltable table 22. Rocking movements of the table 22 are controlled by a rocking device including an adjustable guide bar 23 which is received between three rollers 24 supported on the table 22. The bar 23 may be fixed to the housing 18 in a number of different angular positions and rocks the table 22 in synchronism with longitudinal displacements of the slide 20.

The table 22 is reciprocated by an electric motor 25 which is mounted on the housing 18 and by a gear train including a first pair of meshing spur gears 26 which act as a gear reducer and one of which is directly driven by the output shaft of the motor 25, a second pair of meshing spur gears 27, two pairs of meshing bevel gears 28, 29, a third pair of meshing spur gears 30 one of which drives a horizontal spindle 31 mounted in the carriage 19 and meshing with a spindle nut 32 which is fixed to and extends downwardly from the slide 20. The tool holder 11 is adjustable and enables the tool 12 to assume a position in which its axis crosses in space the axis of the workpiece 13. The workpiece is mounted between a pair of tailstocks 33, 34 carried by the tiltable table 22. If desired, the tailstocks may be mounted on a plate which is tiltably supported by the table 22.

In operation, the tool 12 drives the workpiece 13 when the latter is lifted by the slide 15 into the range of serrated teeth on the tool. At the same time, the motor 25 drives the gear train 26–32 and causes the workpiece to reciprocate back and forth in the axial direction of the tool.

The means for reciprocating the slide 15 upwardly and downwardly along the front face of the column 10a comprises a horizontal cam shaft 35 whose forward end portion carries a detachable blocking cam 36. The shaft 35 is driven by an electric motor 37 through a suitable transmission 38 and through a worm drive including a worm 39 driven by the transmission 38 and a worm wheel 40 which is mounted on the cam shaft 35. The rear end portion of the shaft 35 carries two control cams 41, 42 which respectively cooperate with the trips of two electric switches 43, 44 to regulate the operation of the shaving machine.

The blocking cam 36 cooperates with a roller follower 45 mounted on a horizontal pin 46 which is carried by the slide 15. The follower 45 tracks the face of the cam 36 so that the extent of movement of the workpiece 13 toward and away from the tool 12 depends on the configuration of the cam 36. A resilient element, here shown as a package of dished springs 47 which operate between the base 10c and the slide 15, maintains the follower 36 in permanent abutment with the face of the cam 36. The bias of the package 47 may be adjusted by a screw 48.

The hereto described parts of the shaving machine are disclosed and claimed in a copending application Serial No. 212,763 of Fritz Hurth, now abandoned, which is assigned to the same assignee.

In accordance with our present invention, the tool 12 is driven by a reversible electric motor M which is connected in circuit with a series of relays and switches in such a way that the tool continues to rotate in a given direction for periods of time which are long enough to complete the treatment of at least one workpiece 13. The direction of rotation of the motor M is thereupon reversed so that the tool 12 may complete the treatment of one or more workpieces while it rotates in the opposite direction. In other words, the frequency at which the direction of rotation of the motor M is reversed is such that the periods of time between two successive reversals are sufficient to complete the treatment of at least one workpiece 13 while the tool rotates in a clockwise or in a counterclockwise direction.

The motor M drives a clutch 50 which in turn drives a worm shaft 51 provided with a worm 52 arranged to mesh with a worm wheel 53 which is mounted on a vertical shaft 54. The shaft 54 carries a spur gear 55 which meshes with a spur gear 56 on a second vertical shaft 57. The lower end portion of the shaft 57 carries a spur gear 58 meshing with a spur gear 59 on the upper end portion of a vertical shaft whose lower end portion carries a bevel gear 60. This bevel gear meshes with a bevel gear 61 which is mounted on a horizontal shaft for a spur gear 62. The spur gear 62 meshes with a spur gear 63 on a horizontal shaft 64 which is mounted in the tool holder 11 and carries the tool 12. The gears 55, 56 and/or 62, 63 may be replaced by a suitable transmission, not shown.

The electric circuit arrangement of the reversible motor M is shown in FIG. 3. This circuit arrangement includes a main switch or starter switch 65 which is normally open and which may be closed by hand in order to start the motor M. By closing the switch 65, the operator energizes a starter relay 66 which comprises an armature 66a. A holding circuit includes a holding relay 67 having an armature 67a which is connected in parallel with the starter switch 65. The relay 67 is energized in response to closing of the switch 65, and its purpose is to insure that the circuit of the motor M remains completed during an interval between closing of the starter switch 65 and opening of a normally closed cutoff switch 68. If desired, the cutoff switch 68 may be connected in the circuit of a suitable brake which arrests the shaft 64 and the tool 12 as soon as the circuit of the motor M is open.

Instead of using two relays 66, 67, the relay 66 may be provided with two armatures one of which performs the function of the armature 66a and the other of which then performs the function of the armature 67a.

The circuit arrangement of FIG. 3 further includes a so-called alternating or reversing relay 69 of known design having an arm 69a which always engages one of two spaced contacts 69b, 69c. The arrangement is such that the relay 69 automatically moves the arm 69a into abutment with the contact 69b in response to a first closing of the main switch 65 and that the arm 69a abuts against the contact 69c when the switch 65 is closed for the second time.

When the arm 69a abuts against the contact 69b, a first control relay 70 is energized and closes the armatures 70a, 70b, 70c so that the motor M rotates in a clockwise direction. When the arm 69a abuts against the contact 69c, a second control relay 71 is energized and its armatures 71a, 71b, 71c complete the circuit of the motor M in such a way that the motor rotates in a counterclockwise direction.

The relay 66 may be constructed as a time-lag relay and the holding relay 67 omitted. In such circuit arrangements, the armature 66a will close after the reversing relay 69 has selected the direction of rotation of the motor M.

The machine of FIGS. 1 and 2 operates as follows:

It is assumed that the machine is combined with a feed conveyor which delivers untreated workpieces and with a take-off conveyor which removes finished workpieces to storage or to another machine. When a new workpiece is properly inserted and secured between the tailstocks 33, 34, the operator closes the switch 65 to complete the electric circuit of the motor M whereby the motor rotates in a clockwise direction because the alternating relay 69 has caused its arm 69a to move against the contact 69b. The teeth of the tool 12 mesh with the teeth of the workpiece 13 and the tool continues to rotate in a clockwise direction until the shaving operation is completed. The operator then opens the cutoff switch 68 to open the circuit of the motor M and to arrest the tool 12. The finished workpiece is removed and, as soon as the tailstocks 33, 34 receive and properly support the next workpiece, the operator closes the starter switch 65 whereby the reversing relay 69 automatically shifts the arm 69a into abutment with the contact 69c to insure that the motor M rotates in a counterclockwise direction. The same procedure is repeated as often as necessary whereby the direction of rotation of the motor M is reversed in a fully automatic way whenever the serrated teeth of the tool 12 begin to shave a new workpiece.

It goes without saying that the machine of FIGS. 1 and 2 may be modified so that the tool 12 will shave two, three or more workpieces while the motor M continues to rotate in a clockwise or counterclockwise direction, i.e., the intervals between successive reversals may be long enough to permit shaving of two or more workpieces. All that is necessary is to close the starter switch 65 and to thereupon open the cutoff switch 68 while the workpiece is removed from the work holder 14. It is also possible to provide a holding circuit for each of the control relays 70, 71 so that these relays will remain energized for predetermined periods of time. All such modifications are so obvious that they will be readily comprehended by skilled persons without necessitating additional illustrations. It is further to be noted that the position of the tool 12 and workpiece 13 may be reversed so that the workpiece drives the tool when the motor M is in operation.

Referring again to FIG. 1, the switch 43 may be replaced by the starter switch 65 so that the motor M is started and reversed at the time the work holder 14 begins an upward stroke in response to rotation of the motor 37. Also, the switch 44 may be replaced by the cutoff switch 68 whereby the motor M is arrested in a fully automatic way when the work holder 14 completes a downward stroke.

FIG. 4 illustrates a portion of a modified electric circuit arrangement which includes a source of direct current. The main switch 65 is connected in series with a normally closed cutoff switch 68 and serves to energize a starter relay 66 having an armature 66a. The holding circuit includes a holding relay 67' having an armature 67a' and serving to complete the circuit of the motor M for a period of time which is necessary to finish the treatment of at least one workpiece. There is a reversing or alternating relay 69' of known design having an arm 69a which is alternatively in engagement with contacts 69b, and 69c. Preferably, the relay 69' is an impulse relay, namely, a relay which switches in the event of a surge of current. Control relays 70' (with non-illustrated armatures 70a–70c) and 71' (with non-illustrated armatures 71a–71c) perform the same function as the corresponding control relays of FIG. 3.

The control relay 70' comprises a further armature 70d which is connected in seriese with the winding of the control relay 71', and the relay 71' has an armature 71d which is connected in series with the winding of the relay 70'. The armatures 70d, 71d move away from the corresponding contacts when the respective control relays are energized so that there is no possibility of energizing the relay 70' when the relay 71' is energized or vice versa. Thus, the armatures 70d, 71d serve to prevent a reversal of the motor M while the tool 12 meshes with a workpiece.

In order to make sure that the motor M will be started only after the alternating relay 69' has selected the desired direction of rotation, the holding relay 67' includes a further armature 67b which is connected in the circuit of the starter relay 66. Thus, before the armature 66a can engage its contact, it is necessary that the relays 67' and 69' be energized to insure that the relay 69, has selected the direction of rotation and that the relay 67' will maintain the circuit of the motor completed after the main switch 65 is released and as long as the cutoff switch 68 remains closed. Of course, instead of providing the relay 67' with a second armature 67b, it is equally possible to provide the relay 69' with an armature which replaces the armature 67b as long as such armature engages its contact when the switch 65 returns to open position.

A diode 72 is provided between the conductor 73 connecting the winding of the relay 69' with one terminal of the switch 65 and a conductor 74 which connects the armature 67a' with the winding of the relay 67'. The diode 72 serves as a means for preventing that the relay 69' would remain energized by current flowing from the armature 67a'.

The control relays 70', 71' preferably include additional armatures 70e, 71e which are connected in series in the conduit 73 of the circuit of the alternating relay 69'. These armatures move away from the corresponding contacts when the respective relays are energized. The armatures 70e, 71e prevent an unauthorized person from reversing the motor M by closing the switch 65 when the tool 12 treats a workpiece.

FIGS. 5 and 6 illustrate a modified gear finishing machine which operates in accordance with the so-called plunge method and wherein the workpiece 113 need not reciprocate axially while its teeth mesh with the teeth of a gear-shaped tool 112. The construction and operation of this machine are disclosed in full detail in the aforementioned application Serial No. 212,763 to which reference may be had if necessary. The novelty resides in the provision of a reversible motor M which is accommodated in the hollow head 110b of the frame 110 and which is reversible in a manner as described in connection wtih FIG. 3 or 4. The frame 110 includes a base 110c and a hollow column 110a which latter serves to support and to guide a vertically reciprocable work holder 114. The tool holder 111 is similar to the tool holder 11 and is adjustable with respect to the head 110b so that the axis of the tool 112 may cross in space the axis of the workpiece 112.

The work holder 114 comprises a vertically reciprocable slide 115 which is movable along vertical ways 110b'. The slide 115 supports a work table 122 which is tiltable about a horizontal pin 122a. The table 122 carries two tailstocks 133, 134 for the workpiece 113, and the extent to which this table is rockable about the axis of the pin 122a is determined by two regulating screws 122b, 122c which are mounted on the slide 115 and whose tips are located beneath the table 122 at the opposite sides of the pivot pin 122a.

The tailstocks 133, 134 respectively support substantially prismatic blocking elements 133a, 134a and portions of these blocking elements extend into upwardly opening cutouts provided in the respective tailstocks to be retained in requisite position by clamping screws 133b, 134b. The blocking elements 133a, 134a are preferably located at the opposite sides of and in close or immediate proximity of the tool 112 to insure that the relative position of the axis of the workpiece 113 with respect to the tool 112 remains unchanged irrespective of elastic deformation of the work holder 114 and tool holder 111. The slide 115 is reciprocable along the ways 110b' by a vertical spindle 178 which is mounted on the base 110c and which may be driven by an electric motor 179 or by a handwheel 180. Since the motor 179 or the handwheel 180 must advance the blocking elements 133a, 134a into abutment with a fixed part, i.e., with the tool holder 111 or with another component which is rigid with the frame 110, the transmission in the slide 115 preferably comprises a suitable slip clutch 181 (such as a friction clutch or the like) which permits the motor 179 or the handwheel 180 to rotate with respect to the spindle 178 when the blocking elements prevent further movement of the work holder 114.

The machine of FIGS. 5 and 6 need not comprise means for reciprocating the workpiece 113 with respect to the tool 112 because the axial length of the tool is sufficient to engage the workpiece along the full length thereof (see FIG. 6). Furthermore, the tool 112 is assumed to be a hyperboloidal gear so that the shaving or another finishing operation may be carried out in accordance with the aformentioned plunge or immersion method.

The distance between the axes of the workpiece 113 and tool 112 is determined by the dimensions of the blocking elements 133a, 134a. If the workpiece is a cylindrical spur gear, the height of these blocking elements is the same. If the workpiece is a bevel gear, the height of one blocking element exceeds the height of the other blocking element so that the axis of the workpiece may be properly inclined with reference to the axis of the tool 112.

The manner in which the spindle 178 may be rotated by the motor 179 or by the handwheel 180 is shown in FIG. 6.

The motor M is reversed subsequent to completion of treatment of each consecutive workpiece, of two workpieces, or of a larger number of workpieces. Thus, the tool 112 need not be reversed while its teeth mesh with the teeth of a workpiece.

The machine of FIGS. 5 and 6 may be constructed in such a way that the starter switch 65 for the motor M is closed automatically when a workpiece 113 is properly inserted between the tailstocks 133, 134 and the work holder 114 has moved the workpiece into mesh with the tool 112. The cutoff switch 68 opens automatically as soon as the spindle 178 moves the finished workpiece away from the tool 112.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for treating gears and similar toothed workpieces by means of a revolving gear-shaped tool, comprising the steps of bringing the tool into mesh with a series of consecutive workpieces so that the teeth of the tool treat the teeth of the workpieces; rotating the tool alternatively in a clockwise and counterclockwise direction to insure that all tooth flanks of the tool wear away in response to engagement with the tooth flanks of consecutively treated workpieces; and reversing the tool at such frequency that the length of intervals between successive reversals in the direction of rotation of the tool is sufficient to complete the treatment of at least one workpiece.

2. A process for treating gears and similar toothed workpieces by means of a revolving gear-shaped tool, comprising the steps of bringing the tool into mesh with a series of consecutive workpieces so that the teeth of the tool treat the teeth of the workpieces; rotating the tool alternatively in a clockwise and counterclockwise direction to insure that all tooth flanks of the tool wear away in response to engagement with the tooth flanks of consecutively treated workpieces; and reversing the tool at such frequency that the length of intervals between successive reversals in the direction of rotation of the tool is sufficient to complete the treatment of a single workpiece.

3. A process for treating gears and similar toothed workpieces by means of a revolving gear-shaped tool, comprising the steps of bringing the tool into mesh with a series of consecutive workpieces so that the axis of the tool crosses in space the axis of the respective workpiece and the teeth of the tool treat the teeth of the workpieces; rotating the tool alternatively in a clockwise and counterclockwise direction to insure that all tooth flanks of the tool wear away in response to engagement with the tooth flanks of consecutively treated workpieces; and reversing the tool at such frequency that the length of intervals between successive reversals in the direction of rotation of the tool is sufficient to complete the treatment of at least one workpiece.

4. A process for treating gears and similar toothed workpieces by means of a revolving gear-shaped tool in accordance with the plunge method, comprising the steps of bringing the tool into mesh with a series of consecutive workpieces so that the teeth of the tool treat the teeth of the workpieces; rotating the tool alternatively in a clockwise and counterclockwise direction to insure that all tooth flanks of the tool wear away in response to engagement with the tooth flanks of consecutively treated workpieces; and reversing the tool at such frequency that the length of intervals between successive reversals in the direction of rotation of the tool is sufficient to complete the treatment of at least one workpiece.

5. A process for treating gears and similar toothed workpieces by means of a revolving gear-shaped tool, comprising the steps of bringing the tool into mesh with a series of consecutive workpieces and simultaneously moving one of the meshing parts in the axial direction of the tool so that the teeth of the tool treat the teeth of the workpieces; rotating the tool alternatively in a clockwise and counterclockwise direction to insure that all tooth flanks of the tool wear away in response to engagement with the tooth flanks of consecutively treated workpieces; and reversing the tool at such frequency that the length of intervals between successive reversals in the direction of rotation of the tool is sufficient to complete the treatment of at least one workpiece.

6. An apparatus for treating gears and similar toothed workpieces, comprising a rotary gear-shaped tool arranged to mesh with a series of consecutive workpieces so that its teeth treat the teeth of the workpieces; reversible motor means arranged to rotate the tool and the workpiece which is in momentary mesh with the tool; and reversing means arranged to reverse said motor means at such frequency that the length of intervals between successive reversals is sufficient to complete the treatment of at least one workpiece.

7. An apparatus for treating gears and similar toothed workpieces, comprising a rotary gear-shaped tool arranged to mesh with a series of consecutive workpieces so that its teeth treat the teeth of the workpieces; reversible motor means arranged to rotate the tool and the workpiece which is in momentary mesh with the tool; and reversing means arranged to reverse said motor means at such frequency that the length of intervals between successive reversals is sufficient to complete the treatment of a single workpiece.

8. An apparatus for treating gears and similar toothed workpieces, comprising a rotary gear-shaped tool arranged to mesh with a series of consecutive workpieces so that its teeth treat the teeth of the workpieces; reversible motor means operatively connected with and arranged to rotate the tool whereby the tool drives and its teeth treat the teeth of the workpiece which meshes therewith; and reversing means arranged to reverse said motor means at such frequency that the length of intervals between successive reversals is sufficient to complete the treatment of at least one workpiece.

9. An apparatus for treating gears and similar toothed workpieces, comprising a rotary gear-shaped tool arranged to mesh with a series of consecutive workpieces so that its teeth treat the teeth of the workpieces; reversible motor means arranged to rotate the tool and the workpiece which is in momentary mesh with the tool; and reversing means arranged to automatically reverse said motor means at such frequency that the length of intervals between successive reversals is sufficient to complete the treatment of at least one workpiece.

10. An apparatus for treating gears and similar toothed workpieces, comprising a rotary gear-shaped tool arranged to mesh with a series of consecutive workpieces so that the teeth of the tool treat the teeth of the workpieces; a tool holder for said tool; a work holder arranged to support consecutive workpieces, said holders being constructed to support the tool and the respective workpieces in such a way that the axis of the tool crosses in space the axis of the workpiece which meshes therewith; a reversible electric motor arranged to rotate the tool and the workpiece which is in momentary mesh with the tool; and an electric circuit arrangement for said motor, said circuit arrangement comprising reversing means for automatically reversing said motor at such frequency that the length of intervals between sucessive reversals is sufficient to complete the treatment of at least one workpiece so that the tool rotates in the same direction from the start and all the way to completion of a treating operation.

11. An apparatus as set forth in claim 10, wherein said circuit arrangement comprises starter means and cut-off means arranged to respectively start and arrest said motor and wherein said reversing means is actuated in response to actuation of said starter means so that the motor is reversed automatically by the time it starts to rotate.

12. An apparaus as set forth in claim 10, further comprising means for reciprocating one of said holders back and forth with respect to the other thereof, said reversing means being arranged to reverse said motor in response to beginning of consecutive strokes of said one holder in a predetermined direction.

13. An apparatus as set forth in claim 10, wherein said reversing means includes a reversing relay having an arm movable between two contacts one of which is engaged by said arm when the motor rotates in a clockwise direction and the other of which is engaged by said arm when the motor rotates in a counterclockwise direction.

14. An apparatus as set forth in claim 10, wherein said circuit arrangement comprises a holding circuit for completing the circuit of said motor for predetermined periods the length of which at least equals the time necessary for completing the treatment of a workpiece.

15. An apparatus as set forth in claim 10, wherein said circuit arrangement comprises means for preventing a reversal of said motor while the tool meshes with a workpiece.

References Cited by the Examiner

UNITED STATES PATENTS

| | | | |
|---|---|---|---|
| 2,780,146 | 2/57 | Saari | 90—1.6 |
| 2,938,436 | 5/60 | Bohle et al. | 90—1.6 |
| 3,006,117 | 10/61 | Metz | 90—1.6 X |
| 3,069,977 | 12/62 | Mills | 90—1.6 |
| 3,143,039 | 8/64 | Mills | 90—1.6 |

WILLIAM W. DYER, JR., *Primary Examiner.*